United States Patent
Humphrey et al.

(10) Patent No.: US 6,199,279 B1
(45) Date of Patent: Mar. 13, 2001

(54) METHOD FOR MAKING PAINT ROLLER WITH THERMO PLASTIC CORE

(75) Inventors: Dennis D. Humphrey, Wooster; Serafin J. Gerardo, Mansfield; Thomas G. Purdy, Orrville, all of OH (US)

(73) Assignee: The Wooster Brush Company, Wooster, OH (US)

( * ) Notice: Subject to any disclaimer, the term of this patent is extended or adjusted under 35 U.S.C. 154(b) by 0 days.

(21) Appl. No.: 09/246,765

(22) Filed: Feb. 8, 1999

Related U.S. Application Data
(60) Provisional application No. 60/091,785, filed on Jul. 6, 1998.

(51) Int. Cl.$^7$ .................................................. B21D 53/00
(52) U.S. Cl. ................................. 29/895.211; 29/895.21
(58) Field of Search ............................. 29/895.21, 895.2, 29/895.211; 156/153, 272.2, 275.7

(56) References Cited

U.S. PATENT DOCUMENTS

| | | |
|---|---|---|
| Re. 35,526 | 6/1997 | Garcia . |
| 2,502,638 | 4/1950 | Becht . |
| 3,301,734 | 1/1967 | Britton et al. . |
| 3,376,180 | 4/1968 | Larson et al. . |
| 3,453,163 | 7/1969 | Mills et al. . |
| 3,700,520 | 10/1972 | Hielema . |
| 3,820,212 * | 6/1974 | Spaeder ............................. 29/895.21 |
| 3,905,853 | 9/1975 | Stent . |
| 4,038,731 | 8/1977 | Hill . |
| 4,861,407 * | 8/1989 | Volkmann et al. ............... 156/272.8 |
| 5,114,514 * | 5/1992 | Landis .................................. 156/153 |
| 5,185,184 * | 2/1993 | Koran et al. .......................... 156/153 |
| 5,195,242 | 3/1993 | Sekar . |
| 5,273,604 | 12/1993 | Gracia . |
| 5,397,414 | 3/1995 | Garcia et al. . |
| 5,398,409 | 3/1995 | Sekar . |
| 5,424,133 * | 6/1995 | Eckhardt et al. .................... 156/153 |
| 5,468,207 | 11/1995 | Bower et al. . |
| 5,537,745 | 7/1996 | Musch et al. . |
| 5,572,790 | 11/1996 | Sekar . |
| 5,614,047 | 3/1997 | Garcia . |
| 5,694,688 | 12/1997 | Musch et al. . |

\* cited by examiner

*Primary Examiner*—I Cuda Rosenbaum
(74) *Attorney, Agent, or Firm*—Renner, Otto, Boisselle & Sklar, LLP

(57) ABSTRACT

A method and apparatus for making paint roller covers by spirally advancing a thermoplastic tubular form past a plurality of electronic corona discharge heads arranged in a helical path around the tubular form to subject substantially the entire exterior surface of the tubular form to high frequency, high voltage sparks as the tubular form spirally advances past the heads to make substantially the entire exterior surface more receptive to adhesion when a uniform layer of epoxy adhesive is subsequently applied to the treated exterior surface of the tubular form. Next a fabric strip is spirally wrapped over the epoxy adhesive to bond the fabric strip to the tubular form. To make the exterior surface of the tubular form still more receptive to adhesion, the exterior surface may be preheated immediately prior to treating the exterior surface with high voltage sparks. Also, the fabric backing may be preheated immediately prior to spirally wrapping the fabric strip over the epoxy adhesive layer to minimize the amount of heat dissipated into the fabric. Further, a uniform pressure may be applied to the exterior surface of the fabric after the fabric has been applied over the epoxy adhesive layer to insure an even, uniform adherence of the fabric to the tubular form over substantially the entire surface area of the fabric backing.

9 Claims, 3 Drawing Sheets

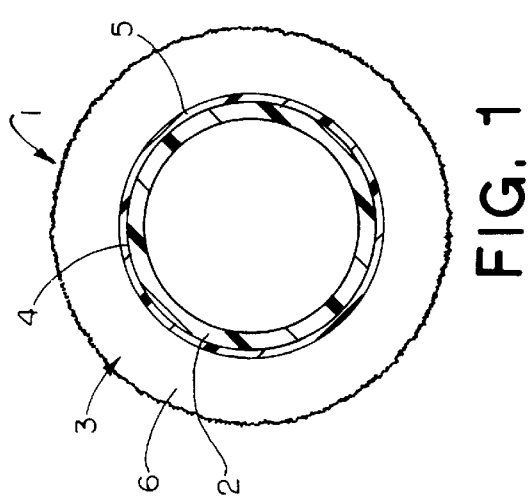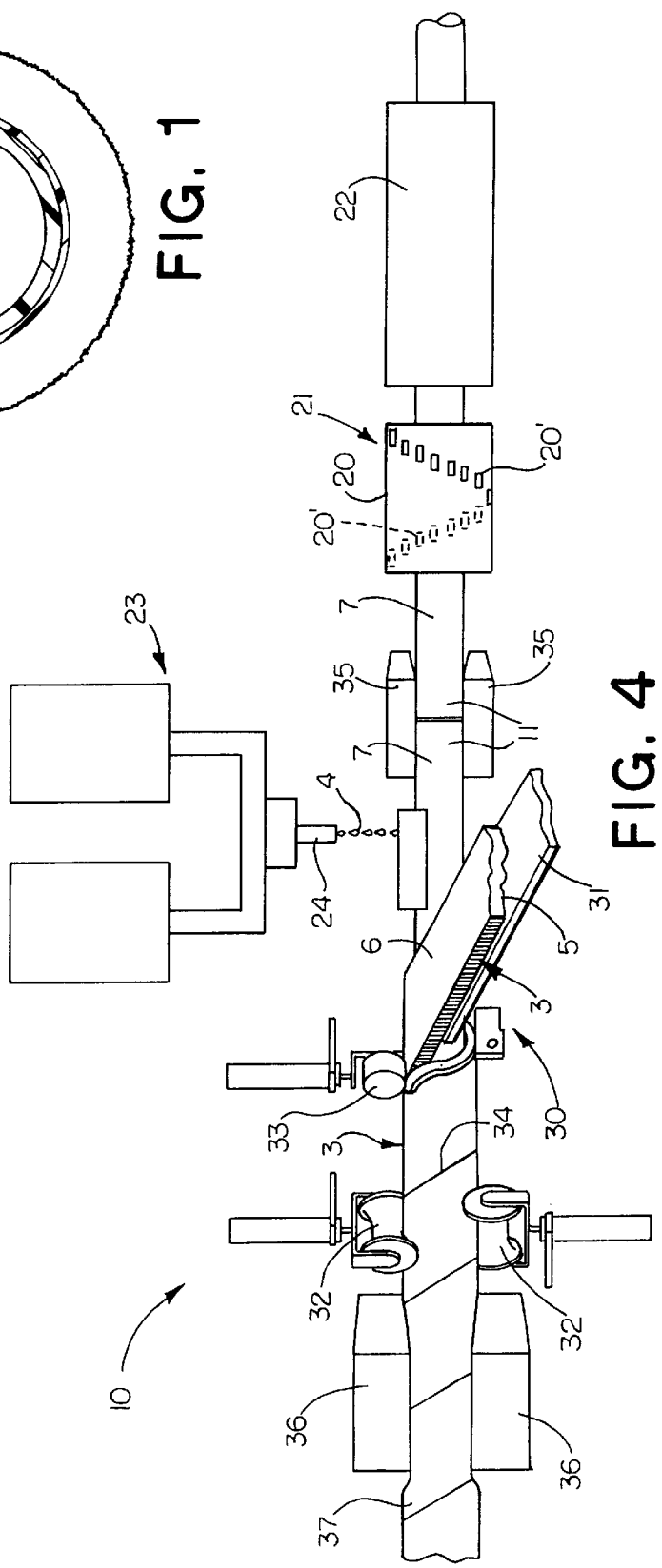

METHOD FOR MAKING PAINT ROLLER WITH THERMO PLASTIC CORE

CROSS-REFERENCE TO RELATED APPLICATIONS

This application claims the benefit of U.S. Provisional Application No. 60/091,785, filed Jul. 6, 1998.

FIELD OF THE INVENTION

This invention relates generally to methods and apparatus for making roller covers by bonding a roller fabric to a thermoplastic tubular form using an intermediate epoxy adhesive.

BACKGROUND OF THE INVENTION

It is generally known to make paint roller covers with thermoplastic cores. Making the cores out of a thermoplastic material has the advantage that the cores will not delaminate even after prolonged soaking as in the case with most cardboard cores. However, it may still be a problem with the roller fabric prematurely separating from thermoplastic tubular forms, either because the adhesive does not provide a very effective bond between the fabric backing and tubular forms, or the adhesive does not hold up after prolonged soaking in certain types of solvents.

One type of adhesive that has been successfully used in the past to adhere the roller fabric to paperboard cores reinforced with a phenolic resin is a two component thermosetting or epoxy adhesive. However, problems have been encountered in obtaining an effective bond between the fabric backing and thermoplastic tubular forms using an epoxy adhesive.

SUMMARY OF THE INVENTION

This invention relates to paint roller covers and method and apparatus for making same by bonding a fabric to tubular forms of thermoplastic core material using an intermediate two component thermosetting adhesive.

In accordance with one aspect of the invention, the exterior surface of the tubular forms of thermoplastic core material is treated prior to the application of the epoxy adhesive to increase the surface tension and polarity of the exterior surface rendering the core material more chemically receptive to adhesion, wetting and bonding.

In accordance with another aspect of the invention, the surface treatment of the tubular forms of thermoplastic core material may include chemical, electronic, plasma or flame treatment.

In accordance with another aspect of the invention, the preferred method of surface treatment is electronic corona discharge, which involves subjecting substantially the entire exterior surface of the tubular core material to a high frequency bombardment of high voltage sparks to alter the molecular structure of the exterior core surface thereby increasing the interaction between the exterior core surface and the adhesive subsequently applied thereto.

In accordance with another aspect of the invention, the exterior surface of the tubular core material is preheated to a temperature of between about 150 to 180° F. immediately prior to the surface treatment step to further enhance the adhesion integrity of the adhesive with the core surface.

In accordance with another aspect of the invention, the ratio of the resin and catalyst that comprise the adhesive is formulated to allow sufficient time (for example 20 to 40 seconds) for the adhesive mixture to penetrate the interstices of the fabric backing before the adhesive mixture cures and sets in order to permanently bond the fabric backing to the exterior surface of the tubular core material.

In accordance with yet another aspect of the invention, the fabric backing is preferably preheated immediately prior to helically winding the fabric onto the plastic core material.

In accordance with still another aspect of the invention, after the adhesive and fabric have been applied to the core material, the fabric covered core material may be further heated using controlled radiant or forced convection heating to further promote the adhesive curing process and then subsequently cooled to normalize the condition of the fabric covered core material prior to cutting the fabric covered core material into a plurality of individual lengths of fabric covered core material.

These and other objects, advantages, features and aspects of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is an enlarged fragmentary transverse section through a preferred form of paint roller cover made in accordance with the present invention.

FIG. 3 is on a somewhat smaller scale than FIG. 2 and shows the tubular core material passing through the apparatus both before and after the fabric is spirally wrapped onto the core material whereas FIG. 2 does not.

FIG. 4 is an enlarged schematic side elevation view of a portion of the apparatus of FIGS. 1 and 2 where the exterior surface of the thermoplastic tubular core material is treated and the adhesive and fabric are subsequently applied to the core material.

DETAILED DESCRIPTION OF THE PREFERRED EMBODIMENT

Figure 2:
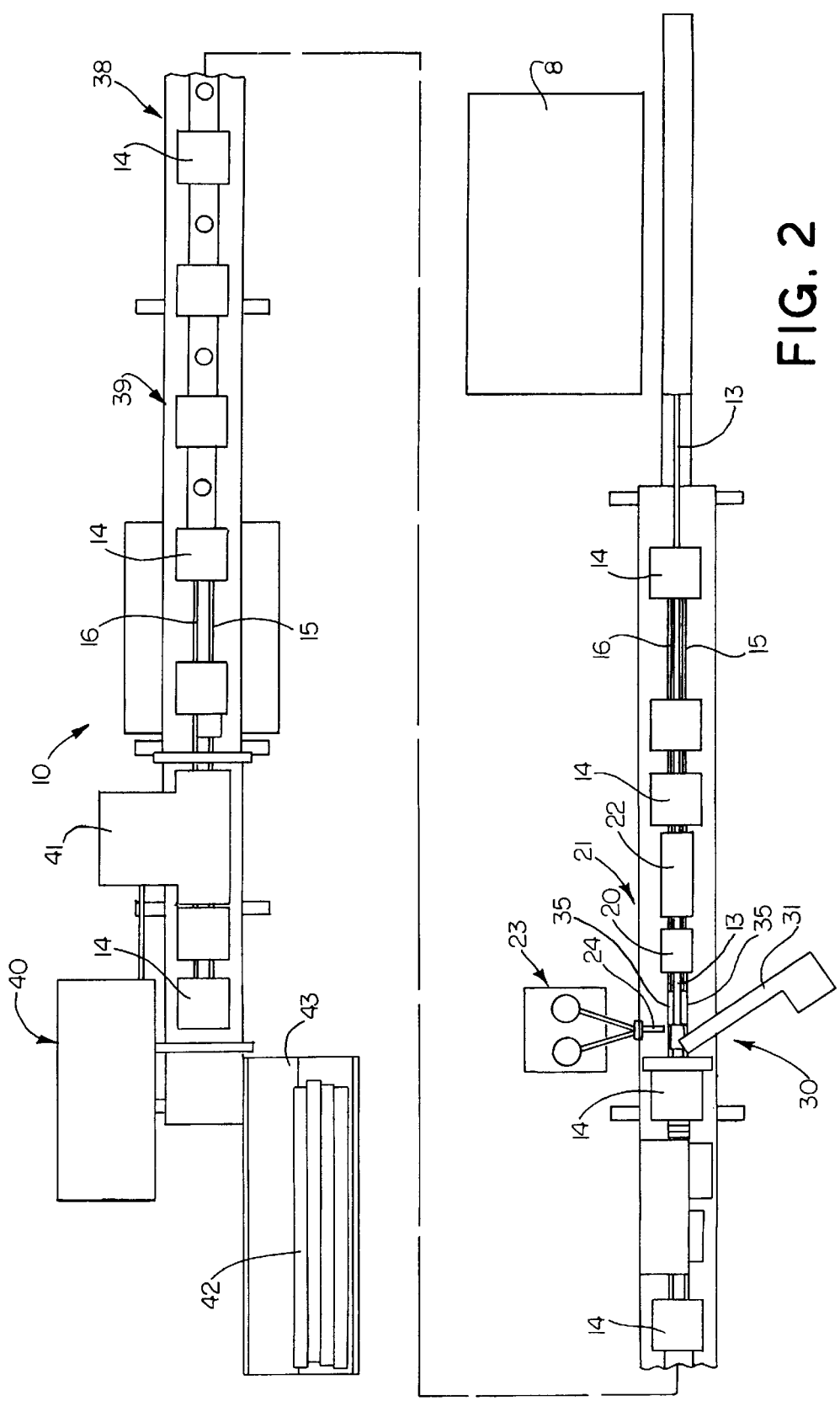
FIGS. 2 and 3 are respectively fragmentary schematic top plan and side elevation views of a preferred form of apparatus for making the paint roller cover of FIG. 1, with portions of the apparatus omitted from both figures for purposes of clarity.

FIG. 1 shows a preferred form of paint roller cover 1 in accordance with this invention including a tubular thermoplastic core 2 to which a suitable fabric 3 is bonded using an intermediate two component thermosetting adhesive 4 as described hereafter.

The core 2 may be made from any crystalline or semi-crystalline polymer that possesses good solvent resistance and rigidity, including natural and filled polypropylene, high density polyethylene, polyvinyl chloride, PET and ABS terpolymer.

The fabric 3 may be a conventional roller cover fabric that preferably has a heavy open weave backing 5 made of a suitable thermoplastic material such as polyester woven into the fabric to allow for a superior mechanical bond between the fabric backing and adhesive. The fabric pile or nap 6 may be made of different materials or blends and be of different heights depending on the particular application.

The adhesive 4 is a two component resin and catalyst epoxy thermosetting adhesive which may be of the type commonly used in the conventional manufacture of paint roller covers having cores made out of tubular paperboard reinforced with a phenolic resin.

The first step in making paint roller covers 1 in accordance with the present invention is to form a plurality of thermoplastic tubes 7 of the desired core dimensions cut to the desired length, for example, 65 inches.

Figure 3:
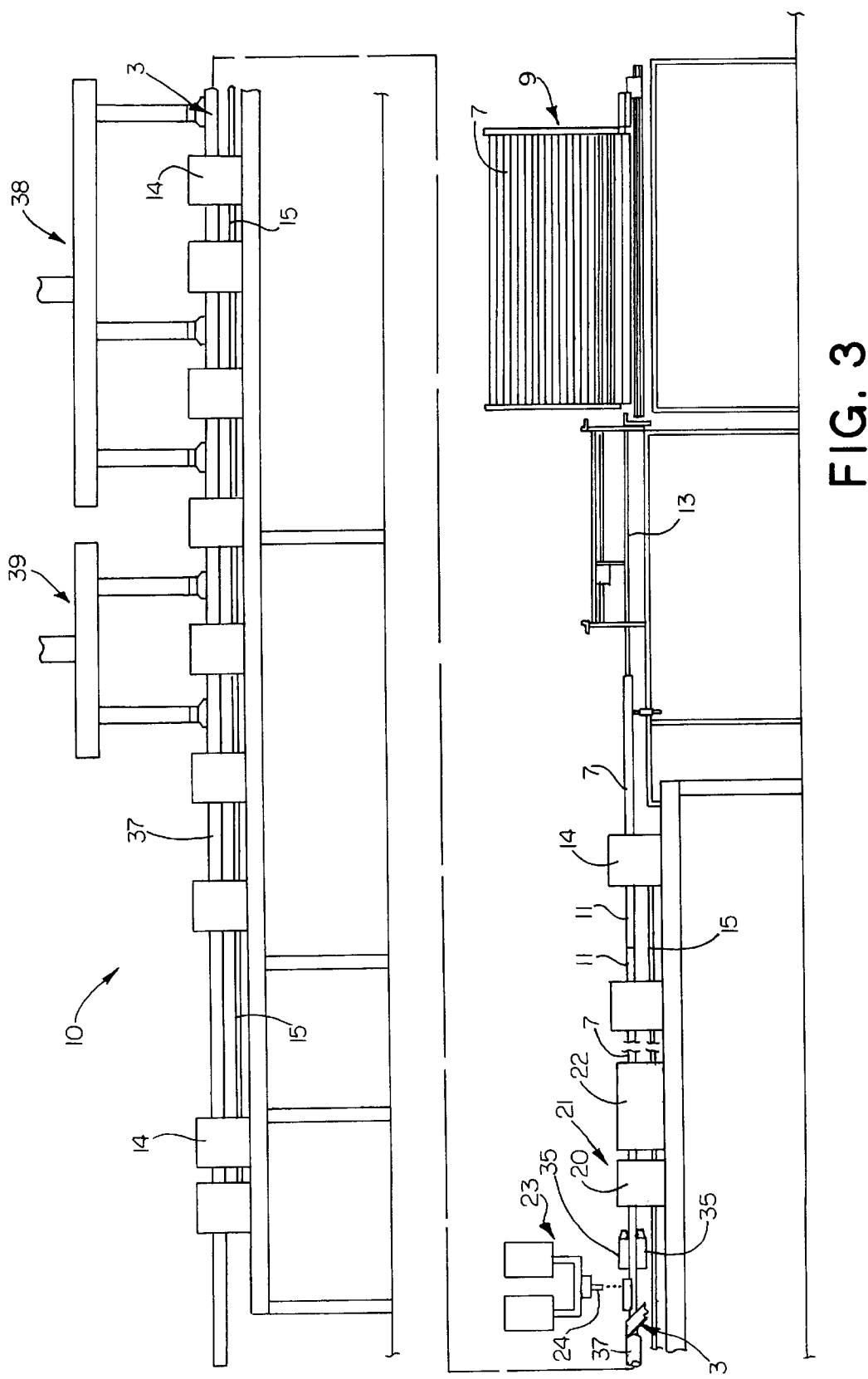

The tubes 7 may be loaded into a hopper 8, schematically shown in FIG. 2, where they are picked up by a vertical conveyor 9, schematically shown in FIG. 3, and continuously fed through a tube spiraling machine/apparatus 10 with the ends 11 of the tubes 7 maintained in abutting engagement with each other (see FIGS. 3 and 4) in a manner disclosed for example in U.S. Pat. No. 5,537,745 assigned to the same assignee as the present invention, the entire disclosure of such U.S. Pat. No. 5,537,745 being incorporated herein by reference.

The tubes 7 are supported during a portion of their travel through the apparatus 10 (up to the time the adhesive is applied to the tubes) by a mandrel 13 (schematically shown in FIGS. 2 and 3), and are driven both axially and rotationally through the apparatus 10 by a plurality of planetary drive assemblies 14 that are driven by two drive shafts 15, 16 that are driven independently. One drive shaft controls the rotational speed of the tubes 7 in a counterclockwise direction while the other drive shaft controls the axial speed of the tubes 7 through the apparatus.

Before the adhesive is applied to the exterior surface of the thermoplastic tubes 7, the exterior surface of the tubes is preferably preheated and pretreated to increase the surface tension and polarity of the tubes rendering them more chemically receptive to adhesion, wetting and bonding. Most plastics are chemically inert and have low surface energy rendering them nonreceptive to bonding with coatings, inks and adhesives. There are several known surface treatment methods available in the industry including chemical, electronic, plasma and flame.

A preferred method of surface treatment according to this invention is electronic corona discharge, which involves passing the tubes 7 through an electronic corona discharge unit 20 at a surface treatment station 21 that includes a plurality of electronic corona discharge heads 20' arranged in a helical path extending around the tubes as schematically shown in FIG. 4 for discharging high voltage sparks around the circumference of the plastic tubes. This subjects substantially the entire exterior surface of the tubes to a high frequency bombardment of high voltage sparks which alter the molecular structure of the surface of the plastic polymer tubes thereby increasing the interaction between the tube surface and the adhesive subsequently applied thereto.

Also, a preheater 22 is preferably located immediately upstream of the surface treatment station 21 to preheat the exterior surface of the tubes 7 to a temperature of about 150 to 180° F. immediately prior to the surface treatment operation.

Immediately after the plastic tubes 7 have undergone the combined preheating and surface treatment processes, the tubes pass by an adhesive dispenser unit 23 that, as best seen in FIG. 4, dispenses a two component resin and catalyst epoxy thermosetting adhesive 4 through a mixing nozzle 24 onto the exterior surface of the tubes at a precise thickness and predetermined resin and catalyst ratio. The epoxy adhesive 4 is preferably heated before it leaves the nozzle 24 so that it is at a temperature of between approximately 150 and 180° F. when it comes into contact with the plastic tubes 7. Heating the epoxy immediately before it is applied to the tubes accelerates the adhesive curing process. Also, preheating the tubes 7 is desirable so that when the adhesive is applied to the tubes, the heat in the epoxy won't immediately be dissipated into the tubes.

Within approximately the next turn after the epoxy 4 has been applied to the exterior surface of the tubes, a fabric strip 3 is spirally wrapped onto the exterior surface of the tubes by a fabric feeder mechanism 30 which includes suitable means (not shown) for adjusting the helix angle of the fabric and for maintaining a predetermined amount of tension on the fabric as the fabric is wound onto the plastic tubes.

A heated plate 31 may be provided for preheating the fabric backing 5 to a temperature for example between approximately 100 and 120° F. immediately before the fabric is spirally wrapped onto the tubes to minimize the amount of heat dissipated into the fabric.

The fabric 3 comes in various lengths, for example, 100 foot lengths. Accordingly, the ends of the fabric must be spliced together in order to provide a continuous supply of fabric to the tubes as the tubes are continuously advanced through the apparatus. As the fabric is spirally wrapped around the tubes, a predetermined amount of tension is maintained on the fabric to insure that the fabric is tightly wrapped around the tubes with the side edges of the fabric in close abutting engagement with each other as schematically shown in FIG. 4.

Moreover, the ratio of the resin and catalyst that comprise the adhesive 4 is preferably formulated to allow sufficient time, for example, 20 to 40 seconds, for the adhesive mixture to penetrate the interstices of the fabric backing 5 before the adhesive mixture cures and sets in order to permanently bond the fabric backing to the exterior surface of the tubes.

FIG. 4 shows a set of elliptically shaped rollers 32, which may either be spring or air operated, located immediately downstream where the fabric 3 is spirally wrapped onto the tubes 7 for applying a preset pressure across the entire width of the fabric to insure an even, uniform adherence of the fabric to the tubes over substantially the entire surface area of the fabric. A third roller 33, which may also be air or spring actuated, is positioned right where the fabric seam 34 initially comes together to insure uniform adherence of the fabric to the tubes along the fabric seam. This has the benefit that when the tubing is subsequently cut into individual paint roller lengths, if a cut should occur across a fabric seam, the edge of the fabric will not pull away from the tubing.

Immediately upstream of the adhesive dispensing system 23 are a series of alignment rollers 35 through which the tubes 7 pass just prior to applying the adhesive and fabric strip material onto the tubes. Also, immediately downstream of the elliptically shaped rollers 32 are a series of alignment rollers 36 through which the fabric covered tubing 37 passes.

Downstream of the alignment rollers 36 is a heating system 38 (see FIGS. 2 and 3) through which the fabric covered tubing passes for subjecting the fabric covered tubing to another stage of controlled radiant or forced convection heating to help maintain the bond line temperature of the fabric covered tubing between approximately 150 and 180° F. for approximately 15 to 20 seconds from the time the adhesive is applied to the tubing to further promote the adhesive curing process.

Downstream of the heating system 38 is a cooling system 39 through which the fabric covered tubing then passes to bring the temperature of fabric covered tubing down below 150° F. to normalize the condition of the fabric covered tubing before the leading end of the fabric covered tubing engages a dead stop assembly 40 where the fabric covered tubing is cut by a planetary cutter 41 into a plurality of individual lengths 42 and then discharged into a discharge hopper 43, schematically shown in FIG. 2, in the manner also disclosed for example in U.S. Pat. No. 5,537,745.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. A method of making roller covers comprising the steps of spirally advancing a thermoplastic tubular form, progressively treating substantially an entire external surface of the tubular form with high frequency, high voltage sparks as the tubular form is spirally advanced to make the exterior surface more receptive to adhesion, applying a uniform layer of an epoxy adhesive to the treated exterior surface of the spirally advancing tubular form, and spirally wrapping a fabric strip over the adhesive layer to bond the fabric strip to the tubular form.

2. The method of claim 1 wherein the thermoplastic tubular form is spirally advanced past a plurality of electronic corona discharge heads arranged in a helical path around the tubular form upstream of where the epoxy adhesive is applied which discharge the high voltage sparks around the circumference of the tubular form to subject substantially the entire exterior surface of the tubular form to high voltage sparks as the tubular form spirally advances past the heads.

3. The method of claim 2 further comprising the step of preheating the exterior surface of the tubular form immediately prior to spirally advancing the tubular form past the heads to make the exterior surface still more receptive to adhesion.

4. The method of claim 1 wherein the fabric strip has a fabric backing, further comprising the step of preheating the fabric backing immediately prior to spirally wrapping the fabric strip over the adhesive layer to minimize the amount of heat dissipated into the fabric.

5. The method of claim 1 wherein the fabric strip includes a fabric backing, further comprising the step of applying a uniform pressure to an exterior surface of the fabric strip after the fabric strip has been spirally wrapped over the adhesive layer to insure an even, uniform adherence of the fabric strip to the tubular form over substantially the entire surface area of the fabric backing.

6. The method of claim 1 wherein the epoxy adhesive comprises a two component resin and catalyst epoxy thermosetting adhesive that are mixed together prior to being applied to the exterior surface of the tubular form.

7. The method of claim 6 wherein the resin and epoxy adhesive are dispensed by a mixing nozzle onto the exterior surface of the tubular form at a precise thickness and predetermined resin and catalyst ratio.

8. The method of claim 1 further comprising the step of heating the fabric covered tubular form immediately after the fabric is applied over the epoxy adhesive to promote curing of the epoxy adhesive.

9. The method of claim 1 further comprising the step of heating the epoxy adhesive before the epoxy adhesive is applied to the exterior surface of the tubular form to accelerate curing of the epoxy adhesive.

* * * * *